Nov. 21, 1950     C. H. H. RODANET     2,530,992
ELECTRICAL DEVICE FOR REPEATING OR
TRANSMITTING ANGULAR DISPLACEMENTS
Filed April 5, 1946     2 Sheets-Sheet 1
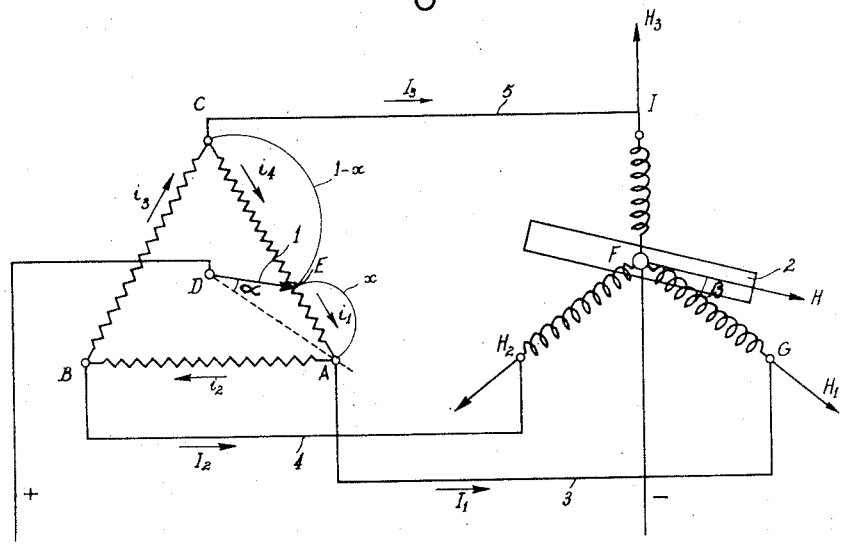
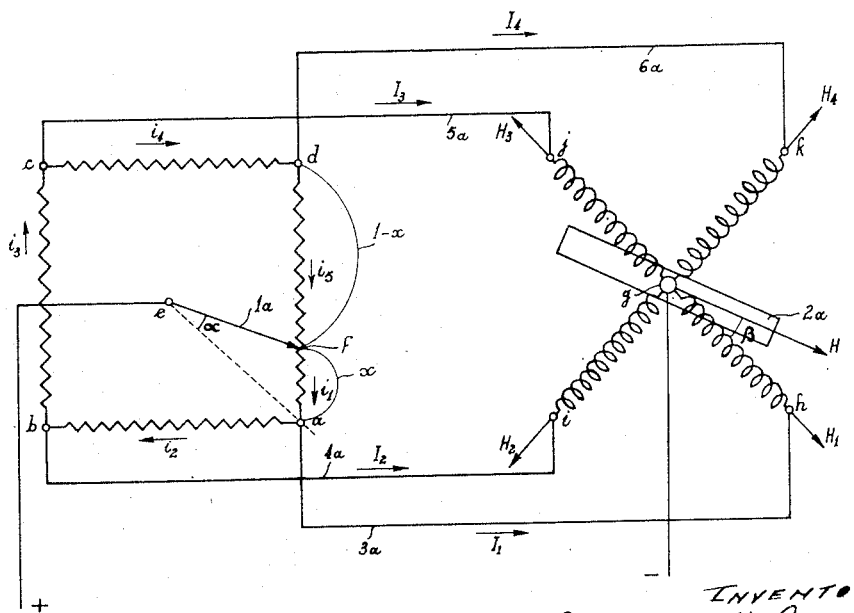
INVENTOR
CHARLES H. H. RODANET
By Haultain, Lake & Co.
AGENTS Nov. 21, 1950     C. H. H. RODANET     2,530,992
ELECTRICAL DEVICE FOR REPEATING OR
TRANSMITTING ANGULAR DISPLACEMENTS Filed April 5, 1946                        2 Sheets-Sheet 2

INVENTOR
CHARLES H. H. RODANET
By:
Haseltine, Lake & Co.
AGENTS

Patented Nov. 21, 1950

2,530,992

UNITED STATES PATENT OFFICE 2,530,992

ELECTRICAL DEVICE FOR REPEATING OR TRANSMITTING ANGULAR DISPLACEMENTS

Charles Hilaire Henri Rodanet, Neuilly-sur-Seine, France, assignor to Societe Anonyme: Jaeger Aviation Application April 5, 1946, Serial No. 659,692
In France April 19, 1945

4 Claims. (Cl. 318—25)

Electric angular repeating devices are ever increasingly widely used for all removed metering purposes. Most frequently they are operated by alternating current only, by induction. However, alternating current is not always available. Other types of such devices operate with direct current by means of a potentiometer. The simpler types of such devices have only one sliding contact and only have a small amplitude of angular displacement for the needle. Others may effect a complete revolution, but comprise two sliders, which makes the device more complicated and increases friction. It should further be observed that the direct current devices do not give an accurate angular repetition but a more or less distorted one.

The repeating device which forms the object of this invention makes it possible to obtain a complete revolution of the receiver with the use of only one slider at the transmitter end, the angular repetition given thereby is accurate, it comprises no toroidal winding of very delicate construction and operates with direct current or in certain cases also with alternating current.

This repeating device comprises in particular:

At the transmitter, a potentiometer in the form of a regular polygon, the take-off connections being provided at the apices thereof and the centre thereof constituting the pivotal point of the slider.

At the receiver, as many windings as the polygonal potentiometer in the transmitter comprises sides, said windings being disposed in star formation around the pivotal axis of a magnet which eventually may be made to carry the index needle.

The windings are supplied through their inner ends whereby they are connected together, and their outer ends are respectively connected with the potentiometer take-offs. The magnet in the receiver may either be a permanent magnet or an electro-magnet supplied in series with the remainder of the device, which will then be able to operate in alternating as well as in direct current; however in the event of an alternating current the circuits would have to be tuned so as to avoid phase-displacement effects. Such a repeating device ensures an absolute fidelity on the reproduction of angular displacements with elimination of the errors existing in the repeating devices provided with circular potentiometer.

The windings of the potentiometer being rectilineal, may easily be produced by mechanical means. On the other hand the couple required for the transmitter may be very small since there is only one slider. According to one feature of the invention, this couple may yet further be reduced by subjecting the slider, provided in the form of a thin resiliently supported plate, to the action of an electro-magnet which imparts thereto a vibratory movement so that it only contacts the windings intermittently.

The transmitter according to this invention allows a high degree of current amplification. Its applications are manifold, such as for example: incidence indicators for aerodynes, fuel level indicators, pressure gauges, tachometers, photometers, thermometers, barometers and like measuring instruments; removed control devices with amplification by saturating transformers or so-called "tranductors" or like power relays; gyroscope-controlled automatic pilots or robots for aerodynes and so on.

The following description made in reference with the appending drawings given by way of a non-restrictive example will make understandable a practical way in which the invention may be carried out.

Figs. 1 and 2 are diagrams, according to two different embodiments, showing a repeater showing absolute fidelity for a transmitter having an unrestricted amplitude of motion.

Figure 3:
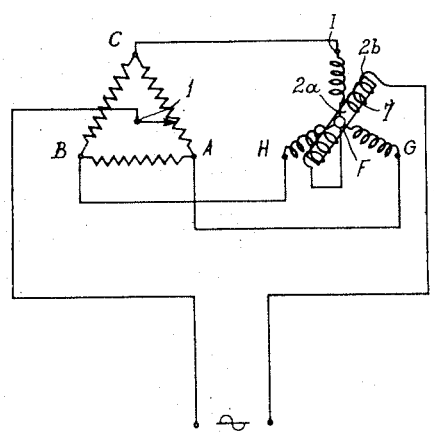
Fig. 3 is a diagrammatic view similar to that illustrated in Fig. 2, wherein the magnet is an electromagnet.

If an accurate angular repetition is desired, both calculation and tests show that it is simply necessary to substitute for a rectilineal or circular potentiometer, a potentiometer in the shape of an equilateral triangle or of a square depending on whether the receiver has three or four windings (Figs. 1 and 2) or more generally by a potentiometer in the form of a regular polygon having a number of sides equal to the number of branches of the star-winding in the receiver.

Referring now to Fig. 1, a pivotal slider I in the transmitter cooperates with a potentiometer having three equal rectilineal sections AB, BC and CA arranged in equilateral triangle formation and is connected to the positive terminal of a source of direct current. Said slider I is pivotally mounted on the geometric center D of the triangular potentiometer.

The receiver comprises three windings FG, FH and FI connected and arranged in star formation, wound at 120° between each other on a magnetic core, if a powerful couple is desired or without a magnetic core if it is merely desired to obtain indicating displacements of a needle. A permanent magnet 2 is pivotally mounted on an axle passing through the center F of said star formation, said magnet serving as a driving member in the event of transmission of power, or being made to carry the needle in the case where the device is used for indicating purposes.

The apices AB and C of the triangular potentiometer are connected by three conductors 3, 4 and 5 respectively to the outer ends of the three star windings FG, FH and FI of the receiver, the centre point F of the windings is connected to the negative terminal of the source. In such conditions, when the slider rides on the potentiometer from the point C to the point 11 passing through B and A, the distribution of current in the three windings varies and the magnet 2 accomplishes a complete revolution; to any displacement of the slider 1 in the transmitter there therefore correspond an amplified angular displacement of the magnet 2 of the receiver.

As already indicated the repeating device according to the invention ensures an absolute fidelity on the reproduction of angular displacements with elimination of the harmonic errors existing in the repeating devices provided with circular potentiometers. For mathematical verification of said result, the following analysis is presented:

With a view to simplify said analysis the resistance $r$ of the windings of the receiver is choiced as new arbitrary unit for resistance. Consequently the resistance value of said windings will be equal to 1. If $R$ is the normal resistance of the sections of the triangular potentiometer the value of said resistance in the new unit system will be equal to $$\frac{R}{r} = a$$

Let it be assumed that the slider 1 and the magnet 2 occupy the positions shown in Fig. 1 in which position the slider 1 form an angle $\alpha$ with the line AD and the magnet 2 forms an angle $\beta$ with the winding FG.

The slider divides the section AC of the potentiometer in two parts AE and EC the resistance of which, measured in the new unit system, have the respective values $ax$ and $a(1-x)$. Thus graphically from Fig. 1 the isosceles triangle ADC gives the following relation:

$$\frac{ax}{\sin \alpha} = \frac{a(1-x)}{\sin 120° -}$$

from which it is obtained:

(1) $\qquad \tan \alpha = \dfrac{x\sqrt{3}}{2-3x}$

Let it further be assumed that the currents flowing in the various circuits are considered as positive in the directions indicated by the arrows illustrated in Fig. 1. By the various laws for networks the following equations are derived from the various current paths in Fig. 1:

(2) $\qquad i_4(1-x)a + i_1xa + I_1 = I_3$
(3) $\qquad I_1 = ai_2 + I_2$
(4) $\qquad I_2 = ai_3 + I_3$
(5) $\qquad i_1 = i_2 + I_1$
(6) $\qquad i_2 = i_3 + I_2$
(7) $\qquad i_3 = i_4 + I_3$ From Equations 5, 6 and 7 it is derived:

(8) $\qquad i_2 = i_1 - I_1$
(9) $\qquad i_3 = i_1 - I_1 - I_2$
(10) $\qquad i_4 = i_1 - I_1 - I_2 - I_3$ By substituting the values $i_2$, $i_3$ and $i_4$ in Equations 2, 3 and 4 the following equations are derived:

(11) $\quad : (1-x)a(i_1 - I_1 - I_2 - I_3) + axi_1 + I_1 = I_3$
(12) $\quad : I_1 = a(i_1 - I_1) + I_2$
(13) $\quad : I_2 = a(i_1 - I_1 - I_2) + I_3$ Said last equations when solved give the values of the currents flowing through conductors 3, 4 and 5 as function of $i_1$, $a$ and $x$:

(14) $\qquad I_1 = i_1 \dfrac{3 + 4a + a^2 - 3ax - a^2x}{6 + 5a + a^2 - 3x - 4ax - a^2x}$

(15) $\qquad I_2 = i_1 \dfrac{3 + a}{6 + 5a + a^2 - 3x - 4ax - a^2x}$

(16) $\qquad I_3 = i_1 \dfrac{3 + a + 3ax + a^2x}{6 + 5a + a^2 - 3x - 4ax - a^2x}$ Said currents $I_1$, $I_2$ and $I_3$ generate in the receipt windings fields which are respectively in direct ratio with said currents:

(17) $\qquad \begin{cases} H_1 = KI_1 \\ H_2 = KI_2 \\ H_3 = KI_3 \end{cases}$

The resulting field H forms the angle $\beta$ with the winding FG generating the field $H_1$, said angle having a tangent the value of which is:

(18)
$$\tan \beta = \frac{(H_3 - H_2) \sin 120°}{(H_1 - H_2) + (H_3 - H_2) \cos 120°} = \frac{\sqrt{3}(H_3 - H_2)}{2(H_1 - H_2) - (H_3 - H_2)}$$

Substituting the values $H_1$, $H_2$, $H_3$ given by the Equation 17 and the values $I_1$, $I_2$ and $I_3$ given by Equations 14, 15 and 16 in Equation 18 and solving said equation it will be found that:

(19) $\qquad \tan \beta = \dfrac{\sqrt{3}(I_3 - I_2)}{2(I_1 - I_2) - (I_3 - I_2)} = \dfrac{x\sqrt{3}}{2 - 3x}$ The relations 1 and 19 which are independent from the potention of the current source and from the resistances of the various elements of the device prove the equality between angles $\alpha$ and $\beta$. Consequently the reproduction of the angular displacements of the slider 1 by the magnet 2 is mathematically accurate without any systematic error, whereby said reproduction is made with absolute fidelity.

In Fig. 2 the embodiment of the potentiometer is arranged in the form of a square $a\ b\ c\ d$ and is connected by four leads $3a$, $4a$, $5a$ and $6a$ to the respective ends of two crossed windings connected to each other at their middle points $g$ for forming four windings $gh$, $gi$, $gj$ and $gk$ arranged in star-formation. In other respects the arrangement is the same.

A mathematical verification as the one presented for the triangular potentiometer will indicate that the square potentiometer gives also an absolute fidelity on the reproduction of angular displacements. Thus graphically on Fig. 2 the isosceles triangle $aed$ gives the following relation:

$$\frac{ax}{\sin \alpha} = \frac{a(1-x)}{\sin (90-)}$$

from which it is obtained:

(20) $\qquad \tan \alpha = \dfrac{x}{1-x}$

On the other hand, the following equations are derived from the various current paths in Fig. 2:

(21) $\quad i_5(1-x)a + i_1xa + I_1 = I_4$
(22) $\quad I_1 = ai_2 + I_2$
(23) $\quad I_2 = ai_3 + I_3$
(24) $\quad I_3 = ai_4 + I_4$
(25) $\quad i_1 = i_2 + I_1$
(26) $\quad i_2 = i_3 + I_2$
(27) $\quad i_3 = i_4 + I_3$
(28) $\quad i_4 = i_5 + I_4$ From Equations 25, 26, 27 and 28 it is derived:

$$i_2 = i_1 - I_1$$
$$i_3 = i_1 - I_1 - I_2$$
$$i_4 = i_1 - I_1 - I_2 - I_3$$
$$i_5 = i_1 - I_1 - I_2 - I_3 - I_4$$

By substituting the values $i_2$, $i_3$, $i_4$ and $i_5$ in Equations 21, 22, 23 and 24, the following equations are derived:

(29) $\quad (1-x)a(i_1 - I_1 - I_2 - I_3 - I_4) + axi_1 + I_1 = I_4$
(30) $\quad I_1 = a(i_1 - I_1) + I_2$
(31) $\quad I_2 = a(i_1 - I_1 - I_2) + I_3$
(32) $\quad I_3 = a(i_1 - I_1 - I_2 - I_3) + I_4$ Said last equations when solved give the value of the currents flowing through conductor $3a$, $4a$, $5a$ and $6a$ as function of $i_1$, $a$ and $x$:

(33)
$$I_1 = i_1 \frac{(4 + 10a + 6a^2 + a^3) - x(6a + 5a^2 + a^3)}{10 + 15a + 7a^2 + a^3 - x(4 + 10a + 6a^2 + a^3)}$$

(34)
$$I_2 = i_1 \frac{4 + 4a + a^2 - x(2a + a^2)}{(10 + 15a + 7a^2 + a^3) - x(4 + 10a + 6a^2 + a^3)}$$

(35)
$$I_3 = i_1 \frac{4 + 2a + x(2a + a^2)}{10 + 15a + 7a^2 + a^3 - x(4 + 10a + 6a^2 + a^3)}$$

(36)
$$I_4 = i_1 \frac{4 + 4a + a^2 + x(6a + 5a^2 + a^3)}{10 + 15a + 7a^2 + a^3 - x(4 + 10a + 6a^2 + a^3)}$$

Said currents I generate in the receipt windings fields which are respectively in direct ratio with said currents:

(37) $\quad \begin{cases} H_1 = KI_1 \\ H_2 = KI_2 \\ H_3 = KI_3 \\ H_4 = KI_4 \end{cases}$ The resulting field H forms the angle $\beta$ with the winding $gh$ generating the field $H_1$, said angle having a tangent the value of which is:

(38) $\quad \tan \beta = \dfrac{H_4 - H_2}{H_1 - H_3}$

Substituting the values $H_1$, $H_2$, $H_3$, $H_4$ given from the Equations 37 and the values $I_1$, $I_2$, $I_3$, $I_4$ given by Equations 33, 34, 35 and 36 in Equation 38 and solving said equation it will be found that:

(39) $\quad \tan \beta = \dfrac{I_4 - I_2}{I_1 - I_3} = \dfrac{x}{1-x}$

The relations 20 and 39 which are independent from the potential of the current source and from the resistances of the various elements of the device prove the equality between angles $a$ and $\beta$. Consequently, the reproduction of the angular displacements of the slider $1a$ by the magnet $2a$ is mathematically accurate without any systematic error, whereby said reproduction is made with absolute fidelity.

A similar mathematical and geometrical check for an embodiment comprising a polygonal potentiometer having $n$ legs also will prove that the similar angles $a$ and $\beta$ remain equal whatever said number $n$ may be.

In Fig. 3 the transmitter comprises an electromagnet $2b$ the winding 7 of which is connected in series at F with the windings FG, FH, and FI of the receiver and the device is supplied with alternating current.

Figure 4:
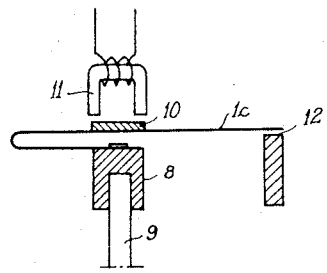
Fig. 4 is a diagrammatic showing of the improved construction of the slider of the transmitter.

Lastly Fig. 4 shows a slider for a transmitter constituted by a very flexible resilient plate $1c$ formed into a hair-pin bent and mounted on a hub 8 keyed on its axle of rotation 9. The plate $1c$ carries a soft iron member 10 which is periodically attracted after the manner of a vibrator or trembler by an electro-magnet 11 connected in series with the device. The slider $1c$ then assumes a vibratory motion so that the contact at 12 with the potentiometer is periodically broken, and the otherwise resulting friction therefore suppressed, which makes for a displacement reproduction which is faithful and devoid of inertia, even in the case of a very weak couple to be transmitted as is frequently the case for indicating devices (voltmeters, photometers, and the like).

It will of course be understood that various alterations and changes may be made in the above described forms of embodiment without exceeding the scope of the invention.

What I claim as my invention and desire to secure by Letters Patent is:

1. In an electrical device for repeating or transmitting angular displacements, in combination, a transmitter comprising a potentiometer subdivided into a plurality of contiguous sections connected in series and constituting the sides of a regular polygon, intermediate take-off connections arranged to the vertexes of this polygon, a movable slider disposed in the center of said polygon and in contact only with one leg of said polygon, and means for mounting said slider for rotation on an axis through said center, a receiver comprising a plurality of windings in equal number to that of the said potentiometer sections and which are arranged and electrically coupled in star-formation, a pivoting axle disposed in the center of the said star and a magnet mounted on the said axle, means for connecting the said intermediate take-off connections of the transmitter respectively to the free ends of the receiver windings, and a source of current, a terminal of which is connected to the movable slider of the transmitter, the other terminal of the source being connected to the center of the star formed by the receiver windings, whereby, on the one hand, the currents flowing from said windings to the center of the star have always the same direction so that a subsequent continuous amplification may be obtained if necessary, and, on the second hand, the corresponding flux produced therein induces a magnetic directional field parallel to said slider, so that the reproduction of the angular displacements of said slider by said magnet is made with an absolute fidelity.

2. In an electrical device for repeating or transmitting angular displacement, in combination, a transmitter comprising a potentiometer subdivided into a plurality of contiguous sections connected in series and constituting the sides of a regular polygon, intermediate take-off connections arranged to the vertexes of this polygon, a movable slider disposed in the center of said polygon and in contact only with one leg of said polygon, and means for mounting said slider for rotation on an axis through said center, a receiver comprising a plurality of windings in equal number to that of the said potentiometer sections and which are arranged and electrically coupled in star-formation, a pivoting axle disposed in the center of the said star and a permanent magnet mounted on the said axle, means for connecting the said intermediate take-off connectings of the transmitter respectively to the free ends of the receiver windings, and a source of current, a terminal of which is connected to the movable slider of the transmitter, the other terminal of the source being connected to the center of the star formed by the receiver windings, whereby on the one hand the currents flowing from said windings to the center of the star have always the same direction, so that a subsequent continuous amplification may be obtained if necessary, and, on the second hand, the corresponding flux produced therein induces a magnetic directional field parallel to said slider, so that the reproduction of the angular displacements of said slider by said magnet is made with an absolute fidelity.

3. In an electrical device for repeating or transmitting angular displacements, in combination, a transmitter comprising a potentiometer subdivided into a plurality of contiguous sections connected in series and constituting the sides of a regular polygon, intermediate take-off connections arranged to the vertexes of this polygon, a movable slider disposed in the center of said polygon and in contact only with one leg of said polygon, and means for mounting said slider for rotation on an axis through said center, a receiver comprising a plurality of windings in equal number to that of the said potentiometer sections and which are arranged and electrically coupled in star-formation, a pivoting axle disposed in the center of the said star and an electromagnet mounted on the said axle the winding of which has an end connected to the common point of the star-winding formation, means for connecting the said intermediate take-off connections of the transmitter respectively to the free ends of the receiver windings, and a source of alternating current, a terminal of which is connected to the movable slider of the transmitter, the other terminal of the source being connected to the free end of said electromagnet winding, whereby, on the one hand, the currents flowing from said windings to the center of the star have always the same direction, so that a subsequent continuous amplification may be obtained if necessary, and, on the second hand, the corresponding flux produced therein induces a magnetic directional field parallel to said slider so that the reproduction of the angular displacements of said slider by said electromagnet is made with an absolute fidelity.

4. In an electrical device for repeating or transmitting angular displacements, in combination, a transmitter comprising a potentiometer subdivided into a plurality of contiguous sections connected in series and constituting the sides of a regular polygon, intermediate take-off connections arranged to the vertexes of this polygon, a pivotable slider of resilient material hair-pin shaped disposed in the center of said polygon and in contact only with one leg of said polygon, means for mounting said slider for rotation on an axis through said center, a pivot supporting one end of said hair-pin shaped slider, a soft iron member secured on the free branch of said hair-pin shaped slider and an electromagnet adapted to periodically attract said soft iron member, a receiver comprising a plurality of windings in equal number to that of the said potentiometer sections and which are arranged and electrically coupled in star-formation, a pivoting axle disposed in the center of the said star and a magnet mounted on the said axle, means for connecting the said intermediate take-off connections of the transmitter respectively to the free ends of the receiver windings, and a source of current, a terminal of which is connected to the movable slider of the transmitter, the other terminal of the source being connected to the center of the star formed by the receiver windings, whereby, on the one hand, the currents flowing from said windings to the center of the star have always the same direction, so that a subsequent continuous amplification may be obtained if necessary, and, on the second hand, the corresponding flux produced therein induces a magnetic directional field parallel to said slider, so that the reproduction of the angular displacements of said slider by said magnet is made with an absolute fidelity.

CHARLES HILAIRE HENRI RODANET.

REFERENCES CITED

The following references are of record in the file of this patent:

UNITED STATES PATENTS

| Number | Name | Date |
|---|---|---|
| 1,774,673 | Schleicher et al. | Sept. 2, 1930 |
| 2,345,936 | Jewell | Apr. 4, 1944 |
| 2,391,058 | Lingel | Dec. 18, 1945 |
| 2,396,244 | Borsum | Mar. 12, 1946 |
| 2,432,029 | Manildi | Dec. 2, 1947 |
| 2,452,042 | Everett et al. | Oct. 26, 1948 |